United States Patent [19]

Horn et al.

[11] 4,447,561

[45] May 8, 1984

[54] STABLE WATER GLASS SOLUTIONS, PROCESS FOR THEIR PREPARATION AND USE FOR ORGANOSILICATE FOAMS AS WELL AS A PRODUCTION PROCESS THEREFOR

[75] Inventors: Peter Horn, Heidelberg; Robert Gehm, Limburgerhof; Matthias Marx, Bad Durkheim; Artur Roeber, Ludwigshafen, all of Fed. Rep. of Germany

[73] Assignee: BASF Aktiengesellschaft, Ludwigshafen, Fed. Rep. of Germany

[21] Appl. No.: 513,724

[22] Filed: Jul. 14, 1983

[30] Foreign Application Priority Data

Jul. 23, 1982 [DE] Fed. Rep. of Germany ....... 3227580

[51] Int. Cl.$^3$ ..................... C08G 18/14; C08G 18/30; C08G 18/38; C08K 3/00
[52] U.S. Cl. ................... 521/118; 521/111; 521/129; 521/122; 252/182; 252/192
[58] Field of Search ................ 521/111, 118, 122; 252/182, 192

[56] References Cited

U.S. PATENT DOCUMENTS

| | | | |
|---|---|---|---|
| 3,607,794 | 9/1971 | Abbotson et al. | 521/122 |
| 3,981,831 | 9/1976 | Markusch et al. | 521/122 |
| 4,097,423 | 6/1978 | Dieterich | 521/154 |
| 4,129,696 | 12/1978 | Markusch et al. | 521/122 |
| 4,136,238 | 1/1979 | Hilterhaus et al. | 521/122 |
| 4,142,030 | 2/1979 | Dieterich et al. | 521/122 |
| 4,146,509 | 3/1979 | Markusch et al. | 521/122 |
| 4,198,487 | 4/1980 | Scholl et al. | 521/122 |
| 4,282,129 | 8/1981 | Blount | 521/121 |
| 4,288,559 | 9/1981 | Illger et al. | 521/122 |
| 4,296,211 | 10/1981 | Blount | 521/122 |
| 4,357,429 | 11/1982 | Blount | 521/122 |

FOREIGN PATENT DOCUMENTS 1362003 9/1964 France .
1419552 2/1966 France .

*Primary Examiner*—H. S. Cockeram
*Attorney, Agent, or Firm*—Norbert M. Lisicki

[57] ABSTRACT

Stable water glass solutions are obtained
(A) by mixing a solution of an aqueous alkali silicate solution and alkali hydroxide with a tertiary amine and subsequently oxyalkylating the resultant two-phase reaction mixture with at least one alkylene oxide in such an amount that a uniform solution forms or
(B) by oxyalkylating a tertiary amine with at least one alkylene oxide and mixing the resultant reaction mixture with a solution of an aqueous alkali silicate solution and alkali hydroxide.

The stable water glass solutions are suitable for the preparation of organo silicate foams.

For the preparation of the organo silicate foams, a mixture of the stable water glass solutions and tertiary amino group-containing polyether polyols is reacted with organic polyisocyanates in the presence of catalysts, blowing agents and optionally auxiliaries and additives.

12 Claims, No Drawings

STABLE WATER GLASS SOLUTIONS, PROCESS FOR THEIR PREPARATION AND USE FOR ORGANOSILICATE FOAMS AS WELL AS A PRODUCTION PROCESS THEREFOR

BACKGROUND OF THE INVENTION

1. Field of the Invention

This invention relates to a process for oxyalkylating aqueous alkali silicate solutions containing an alkali hydroxide and a tertiary amine. More particularly, the invention relates to oxyalkylated water glass solutions, a process for their preparation and organosilicate foams prepared from them.

2. Prior Art

The preparation of rigid or flexible inorganic-organic plastics is known.

According to data in French Pat. Nos. 1,362,003 and 1,419,552, foams which can be used as insulation material are prepared based on alkali silicates, polyisocyanates and natural or synthetic resins.

According to German published Application No. 17 70 384 (U.S. Pat. No. 3,607,794), silicon-containing products are further obtained by reacting aqueous solutions of an alkali silicate with an organic isocyanate or isothiocyanate.

In order to accelerate the reaction between the water glass solution and the organic polyisocyanates, catalysts are described in German Published Application No. 24 60 834 (U.S. Pat. No. 4,136,238) which have a Zwitter ion structure.

The drawback of these processes is that gel-like deposits are formed even during the mixing process of the components resulting in process and equipment difficulties during the processing and which may result in non-homogeneous plastics.

According to German Published Application No. 2,227,147 (U.S. Pat. No. 4,097,423), the polyisocyanates are replaced by terminal isocyanate group containing prepolymer ionomers having 2 to 200 milliequivalants per 100 grams of ionic groups in order to avoid these drawbacks. Since the prepolymer ionomers must be prepared in an additional process step, this method is expensive. Another drawback is the fact that the products frequently have viscosities above 2000 mPas and at times up to 100,000 mPas and more at 25° C. so that they cannot be processed directly. In order to reduce the viscosity, the prepolymer ionomers must be diluted with additives, for example, solvents or low viscosity isocyanates. This, however, again results in prolonged curing times.

According to data in European published application 579 (U.S. Pat. No. 4,276,404), the organic polyisocyanates are initially reacted with an aqueous basic solution or suspension of the inorganic compounds resulting in a primary dispersion. Subsequently, flowable inorganic compounds and optionally catalysts and additives are incorporated in this primary dispersion resulting in a final dispersion. This process is cumbersome and technically difficult to accomplish.

The purpose of this invention was to develop stable components for the preparation of organo silicate foams which can be processed using commonly employed devices for the polyurethane foam preparation.

Surprisingly, this requirement could be met by using stable water glass solutions which are obtained by (A) Mixing (a) a solution of (i) 100 parts by weight of an aqueous alkali silicate solution and (ii) 1.5 to 20 parts by weight, preferably 3 to 15 parts by weight of an alkali hydroxide with (b) 2 to 12 parts by weight, preferably 3 to 6 parts by weight, of a tertiary amine and subsequent oxyalkylation as the resultant two-phase reaction mixture with (c) at least one mole, preferably 1 to 10 moles, and particularly 1 to 3 moles of at least one alkylene oxide per mole of tertiary amine or (B) Oxyalkalation of (a) 2 to 12 parts by weight, preferably 3 to 6 parts by weight, of a tertiary amine with (b) at least one mole, preferably 1 to 10 moles, and particularly 1 to 3 moles of at least one alkylene oxide per mole of tertiary amine and mixing of the resultant reaction mixture with (c) a solution of (i) 100 parts by weight of an aqueous alkali silicate solution and (ii) 1.5 to 20 parts by weight, preferably 3 to 15 parts by weight of alkali hydroxide.

DESCRIPTION OF THE PREFERRED EMBODIMENTS

The water glass solutions according to this invention are stable and can be mixed with the other components for the preparation of organosilicate foams without silicic acids or other compounds being precipitated.

In a simple and reproducible manner, guaranteeing a uniform course of the polyurethane reaction, and cross-linking of the water glass, largely open-celled organosilicate foams can be produced from the water glass solutions according to this invention analogous with the polyurethane foam technology. With densities of preferably 7 to 20 grams per liter, the resultant substances are extremely light and essentially do not shrink. Even without the addition of common flame retardants, the organo silicate foams are essentially flame retardant and particularly have an extremely low gas density.

We should like to state the following pertaining to the components suitable for use as the stable water glass solutions and the raw materials for the preparation of the organo silicate foams:

Suitable for the preparation of the stable water glass solution according to this invention are aqueous alkali silicate solutions having the formula $M_2O \cdot SiO_2$ in which M is an alkali metal, for example, potassium or, preferably, sodium, and wherein the mole ratio of $M_2OSiO_2$ is greater than one, preferably 1.6 to 4, and particulary 2 to 3.6 and wherein the density is 28 to 60°Be, preferably 35 to 41°Be. Aqueous sodium silicate solutions with mole ratios of $Na_2O:SiO_2$ of 2 to 3.6 and densities of 38 to 40° Be have proven to work well and are, therefore, used on a preferred basis.

One hundred parts by weight of the above-mentioned aqueous alkali silicate solutions are treated with 1.5 to 20 parts by weight, preferably 3 to 15 parts by weight, of alkali hydroxide, for example, potassium hydroxide or, preferably, sodium hydroxide. The alkali hydroxides are used preferably in the form of aqueous solutions, the concentration of which can be varied widely as a function of the density of the alkali silicate solution. Suitable examples include 30 to 80 percent by weight, preferably 40 to 60 percent by weight, aqueous alkali hydroxide solutions with approximately 50 percent by weight aqueous sodium hydroxide solutions being preferred.

Suitable tertiary amines include compounds normally used for accelerating the blowing reaction, that is, compounds which are used for the formation of carbon dioxide from polyisocyanate and water for the preparation of polyurethane foams. Examples include tertiary polyamines, tertiary aminoalkylethers and/or N,N-dialkylalkanolamines which are optionally used in combination with metal nitrates such as zinc and/or copper nitrate. Preferably used are N,N,N',N'-tetramethyl-di-(2-aminoethyl)ether, N,N',N',N'',N''-pentamethyl diethylenetriamine and/or N,N-dimethylethanolamine. The tertiary amines are used in amounts of 2 to 12 parts by weight, preferably 3 to 6 parts by weight per 100 parts by weight of aqueous alkali silicate solution.

Suitable alkylene oxides include 2,3-epoxypropanol-1 and, preferably, ethylene oxide, 1,2-propylene oxide or their mixtures. For the oxyalkylation, at least one mole, preferably 1 to 10 moles, and particularly 1 to 3 moles of alkylene oxide or alkylene oxide mixture are used per mole of tertiary amine. The stable water glass solutions of this invention can be prepared by various methods. According to the preferably used method A, the solution of aqueous alkali silicate solution and alkali hydroxide, advantageously aqueous sodium hydroxide solution, is mixed with the tertiary amine at temperatures of 0° C. to 50° C. while being stirred. This results in a two-phase reaction mixture which is oxyalkylated with at least one alkylene oxide, preferably ethylene oxide, at temperatures of 10° C., to 100° C., preferably of 10° C. to 50° C., while being stirred until a homogeneous solution has been obtained. This requires the quantities of alkylene oxide mentioned above.

According to another mode of operation, the tertiary amine is initially mixed with at least one alkylene oxide, preferably ethylene oxide, at temperatures of 10° C. to 100° C., preferably of 10° C. to 50° C., while being stirred and the resultant reaction mixture is mixed with the solution of aqueous alkali silicate solution and alkali hydroxide while being stirred at temperatures of 10° C. to 100° C., preferably 10° C. to 60° C. It may also be advantageous to carry out the oxyalkylation under pressure, for example, at 1 to 10 bars, preferably 2 to 7 bars, and optionally in the presence of inert gas, preferably nitrogen.

The stable water glass solutions of this invention are preferably used for the preparation of organosilicate foams.

For the preparation of the organosilicate foams, the starting materials are reacted employing well-known methods in polyurethane foam chemistry, preferably as two-component systems, using the one-shot method.

Referred to as the A-component is a reaction mixture which contains catalysts and optionally physical blowing agents, auxiliaries and additives in addition to the compounds with reactive hydrogen atoms and the B-component comprises the organic polyisocyanates which may optionally be mixed with physical blowing agents, auxiliaries and additives.

Suitable compounds with reactive hydrogen atoms include the stable water glass solutions of this invention which are mixed with tertiary amino group-containing polyether polyols for the preparation of the organosilicate foams. Suitable mixtures contain 1 to 20 parts by weight, preferably 2 to 8 parts by weight, of the amino group-containing polyether polyols per 100 parts by weight of water glass solution. Other common polyether polyols may optionally also be used such as polyols with functionalities of 2 to 8, preferably 3 to 6, and hydroxyl numbers of 30 to 800, preferably of 40 to 700, hydroxyl group-containing polymers with functionalities of 2 to 6 and hydroxyl numbers of 50 to 400 such as hydroxyl group-containing polyesters, polyester amides, polyacetals and polycarbonates as well as chain extenders and/or crosslinking agents.

The tertiary amino group-containing polyether polyols to be used in accordance with this invention which contain at least one, preferably 1 to 5, tertiary amino groups as bridge members in bonded form in the polyoxyalkylene chain have hydroxyl numbers of 200 to 800, preferably of 400 to 700, and functionalities of 2 to 5, preferably of 3 to 4. The products may be prepared in accordance with known methods from one or more alkylene oxide with 2 to 4 carbon atoms in the alkylene radical and an amino group-containing initiator molecule which contains in bonded form 2 to 5, preferably 3 to 4, active hydrogen atoms. Suitable alkylene oxides include 1,2- and/or 2,3-butylene oxide and preferably ethylene oxide and 1,2-propylene oxide. The alkylene oxides may be used individually, alternatingly in sequence or as mixtures. Suitable amino group-containing initiator molecules include, for example: ammonia, hydrazine, N-mono- and N,N'- and/or N,N-dialkylhydrazines with 1 to 6 carbon atoms in the alkyl radical; optionally N-mono-, N,N- and N,N'-dialkyl substituted diamines with 1 to 6 carbon atoms in the alkyl radical, such as ethylenediamine, 1,2- and 1,3-propylenediamine, 1,4-butylenediamine, 1,6-hexamethylenediamine, 2,4- and 2,6-toluenediamine, 4,4'-, 2,4'- and 2,2'-diaminodiphenylmethane as well as the corresponding distillation residues as they are obtained after distilling pure diamines from the reaction mixtures; amino alcohols such as mono-, di- or trialkanolamines; dialkylenetriamines, trialkylenetetramines and oligomeric polyalkylene polyamines. Preferably used as amino group-containing initiator molecules are ethylenediamine, 1,4-butylenediamine, 1,6-hexamethylenediamine as well as the corresponding distillation residue; triethanolamine and diethylenetriamine.

The tertiary amino group-containing polyether polyols may be used alone or in mixtures. They may also be mixed with commonly used, that is, non-nitrogen containing polyether polyols or hydroxyl group-containing polymers of the above-mentioned type.

Mixtures which have proven to work well consist of 50 to approximately 100 percent by weight, preferably 70 to 97 percent by weight, based on the total weight of the mixture of at least one tertiary amino group-containing polyether polyol and from about 0 to 50 percent by weight, preferably 3 to 30 percent by weight, based on the overall weight of the mixture of a non-nitrogen containing polyether polyol or another hydroxyl group-containing polymer.

The commonly used polyether polyols are prepared according to known methods from one or more of the above-mentioned alkylene oxides and at least one nitrogen-free initiator molecule with 2 to 8, preferably 2 to 3, reactive hydrogen atoms. Suitable initiator molecules include: water, phosphoric acid, polycarboxylic acids, particularly dicarboxylic acids such as adipic acid, succinic acid, phthalic acid and terephthalic acid and preferably polyhydroxyl compounds such as ethylene glycol, propylene glycol, diethylene glycol, dipropylene glycol, pentaerythritol, sorbitol, sucrose and preferably glycerin and trimethylolpropane.

As already mentioned, hydroxyl group-containing polyesters, polyester amides, polyacetals and polycarbonates are suitable hydroxyl group-containing polymers. The hydroxyl group-containing polyesters may be prepared, for example, from dicarboxylic acids, preferably aliphatic dicarboxylic acids with 2 to 12, preferably 4 to 8, carbon atoms in the alkylene radical and multifunctional alcohols, preferably diols. Examples include aliphatic dicarboxylic acids such as glutaric acid, pimelic acid, subaric acid, azelaic acid, sebacic acid, undecanedioic acid, dodecanedioic acid and preferably succinic and adipic acid and aromatic dicarboxylic acids such as phthalic acid and terephthalic acid. Examples of bi- or multifunctional, particularly bi- and trifunctional alcohols are ethylene glycol, diethylene glycol, 1,2-propylene glycol, trimethylene glycol, dipropylene glycol, 1,10-decanediol, glycerin, trimethylolpropane and preferably 1,4-butanediol and 1,6-hexanediol.

The polyester amides include, for example, the predominantly linear condensates with reactive hydrogen atoms obtained from multifunctional saturated and/or unsaturated carboxylic acids and/or their anhydrides and multi-functional saturated and/or unsaturated amino alcohols or mixtures of multifunctional alcohols and amino alcohols and/or polyamines.

Suitable hydroxyl group-containing polyacetals include, for example, those compounds prepared from glycols such as diethylene glycol, triethylene glycol, 4,4′-di(2-hydroxyethoxy)diphenyldimethylmethane, hexane diol and formaldehyde. Suitable polyacetals may also be prepared by polymerizing cyclic acetals.

Possible carbonates including hydroxyl groups are those of the basically known type which may be prepared, for example, by reacting diols such as 1,3-propanediol 1,4-butanediol and/or 1,6-hexanediol, diethylene glycol, triethylene glycol, tetraethylene glycol with diaryl carbonates, for example, diphenyl carbonate or phosgene.

In order to achieve specific mechanical properties, it may be advantageous to also use chain extenders and/or cross-linking agents for the preparation of the organo silicate foams in addition to the already mentioned water glass solutions, polyether polyols containing tertiary amino groups and, optionally, nitrogen group free polyether polyols and/or hydroxyl group-containing polymers. Such substances include polyfunctional, particularly di- and trifunctional compounds with molecular weights of 17 to 600, preferably 60 to 300. Employed, for example, are di- and trialkanolamines such as diethanolamine and triethanolamine, aliphatic and aromatic diamines such as ethylenediamine, 1,4-butylenediamine, 1,6-hexamethylenediamine, 4,4′-diaminodiphenylmethane, 3,3′-dialkyl substituted 4,4′-diaminodiphenylmethanes, optionally 3,5-dialkyl substituted 2,4- and 2,6-toluene diamine and preferably aliphatic diols and triols with 2 to 6 carbon atoms such as ethylene glycol, 1,4-butanediol, 1,6-hexanediol, glycerin and trimethylolpropane.

In order to accelerate the reaction between the compounds with reactive hydrogen atoms and polyisocyanates, commonly used polyurethane catalysts are added to the reaction mixture or preferably to the A-component in an amount of 0.01 to 10 parts by weight, preferably of 0.1 to 3 parts by weight per 100 parts by weight of the mixture of stable water glass solutions and tertiary amino group-containing polyether polyols. Preferably used are basic polyurethane catalysts, for example, tertiary amines such as dimethylbenzylamine, dicyclohexylmethylamine, dimethylcyclohexylamine, N,N,N′,N′-tetramethyldiaminoethylether, bis(dimethylaminopropyl)urea, N-methyl- and/or N-ethylmorpholine, dimethylpiperazine, pyridine, 1,2-dimethylimidazole, 1-azabicyclo(3,3,0)octane, dimethylaminoethanol, N,N′,N″-tris(dialkylaminoalkyl)hexahydrotriazines such as N,N′,N″-tris(dimethylaminopropyl)-s-hexahydrotriazine and particularly triethylenediamine and triethanolamine. Moreover, metal salts such as iron-(II)-chloride, zinc chloride, lead octoate and preferably tin salts such as tin dioctoate, tin diethylhexoate and dibutyl tin dilaurate are also suitable. These are generally used in combination with the basic polyurethane catalysts.

Suitable blowing agents are particularly carbon dioxide which is formed during the reaction of water with the organic polyisocyanates. Mixtures of physical blowing agents with water which are preferably incorporated in the A-component may also be used. It may optionally also be advantageous to mix the organic polyisocyanate with the physical blowing agent thereby reducing the viscosity of the B-component.

Suited as physical blowing agents are liquids which are inert with respect to the inorganic polyisocyanates and which have boiling points below 100° C., preferably below 50° C., and particularly between $-50°$ C. and $+30°$ C. under atmospheric pressure so that they evaporate under the influence of the exothermal polyaddition and polycondensation reaction. Examples of such preferably used liquids are hydrocarbons such as pentane, n- and iso-butane and propane, ethers such as dimethylether and diethylether, ketones such as acetone and methylethyl ketone, ethylacetate and preferably halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low boiling liquids with each other and/or with other substituted or unsubstituted hydrocarbons may also be used.

The amount of physical blowing agents required in addition to water can be determined simply as a function of the desired foam density and amounts of approximately 1 to 50 parts by weight, preferably 3 to 40 parts by weight per 100 parts by weight of the mixture of water glass solution and tertiary amino group-containing polyether polyols may be employed.

The B-component advantageously consists of the organic polyisocyanates. Examples for suitable materials for this purpose include aliphatic, cycloaliphatic, aliphatic-aromatic and preferably aromatic multifunctional isocyanates. Detailed examples include: aliphatic diisocyanates such as ethylene, 1,4-tetramethylene, 1,6-hexamethylene and 1,12-dodecane diisocyanates; cycloaliphatic diisocyanates such as cyclohexane-1,3- and 1,4-diisocyanates as well as any desired mixtures of these isomers, 1-isocyanato-3,3,5-trimethyl-5-isocyanatomethyl-cyclohexane, 2,4-and 2,6-hexahydrotoluene diisocyanate as well as any desired mixtures of these isomers, 4,4′- and 2,4′-diisocyanato dicyclohexylmethane; aromatic diisocyanates such as 1,3- and 1,4-phenylene diisocyanate, 2,4- and 2,6- toluene diisocyanate as well as any desired mixtures of these isomers, 2,2′-, 2,4′- and 4,4′-diphenylmethane diisocyanate and naphthalene-1,5-diisocyanate and aromatic polyisocyanates such as 4,4′,4″-triphenylmethane triisocyanate, 2,4,6-triisocyanatobenzene and polyphenylene polymethylene polyisocyanates.

Modified polyisocyanates such as carbodiimide group-containing polyisocyanates (German Pat. No. 10 92 007), allophanate group-containing polyisocyanates (British Pat. No. 994,890; Belgium Pat. No. 761,626), isocyanurate group-containing polyisocyanates (German Pat. No. 10 22 789, German Pat. No. 12 22 067, German Pat. No. 10 27 394, German Published Application No. 19 29 034 and German Published Application No. 20 04 048), urethane group-containing polyisocyanates (Belgium Pat. No. 752,261, U.S. Pat. No. 3,394,164), biuret group-containing polyisocyanates (German Pat. No. 11 01 394, British Pat. No. 889,050) and ester group-containing polyisocyanates (British Pat. No. 965,474, British Pat. No. 10 72 956, U.S. Pat. No. 3,567,763, German Pat. No. 12 31 688) may also be used.

Preferably used are the industrially available aromatic di- and polyisocyanates such as 2,4- and 2,6-toluene diisocyanate as well as any desired mixtures of these isomers, 2,2'-, 2,4'- and 4,4'-diphenylmethane diisocyanate as well as any desired mixtures of these isomers, mixtures of 2,2'-, 2,4'-, 4,4'-diphenylmethane diisocyanates and polyphenylene polymethylene polyisocyanates (crude MDI) and mixtures of toluene diisocyanates and crude MDI as well as urethane and isocyanurate group-containing polyisocyanates. The mentioned di- and polyisocyanates may be used individually or in the form of mixtures.

Auxiliaries and additives may also be incorporated in the reaction mixture, preferably the A-component. Examples include stabilizers, hydrolysis protection agents, pore regulators, fungistats and bacteriostats, dyes, pigments, fillers, surfactants, plasticizers and flame retardants.

Suitable examples include surfactants which promote the homogenization of the starting substances and which are optionally also suited for regulating the cell structure of the foams. Examples include siloxane-oxyalkylene mixed polyalkylphenols, oxyethylated fatty alcohols, paraffin oils, castor oil and/or ricinoleic acid esters and Turkish Red oil which are used in amounts of 0.2 to 8, preferably 0.5 to 5 parts by weight per 100 parts by weight of the mixture of water glass solution and tertiary amino group-containing polyether polyols.

It may also be advantageous to incorporate a plasticizer in the reaction mixture so that the tendency toward brittleness in the products is reduced. Commonly used plasticizers may be used, but it is particularly advantageous to use such substances which contain phosphorous and/or halogen atoms and which thereby further increase the flame resistance of the organo silicate foams. Such substances include tricresylphosphate, tris-2-chloroethylphosphate, tris-chloropropylphosphate and tris-2,3-dibromopropylphosphate.

Fillers include: organic fillers such as melamine, carbon and carbon fibers and inorganic fillers, for example, silicate-containing minerals such as antigorite, serpentine, horn blends, amphiboles, chrisotile, talcum and Transpafill®, metal oxides such as kaolin, titanium oxide and iron oxides, metal salts such as chalk and heavy spar as well as glass. Special mention should also be made of inorganic pigments such as cadmium sulfide and zinc sulfide and flame retardants such as melamine and aluminum oxide hydrate.

More detailed data concerning the above-mentioned other commonly applied additives are contained in the appropriate literature, for example, in the monograph by J. H. Saunders and K. C. Frisch, "High Polymers," vol. XYI, *Polyurethanes*, Parts 1 and 2, Interscience Publishers, 1962 and/or 1964.

For preparing the organo silicate foams, the compounds are reacted with reactive hydrogen atoms and organic polyisocyanates in such quantities that the characteristic number is 2 to 30, preferably 4 to 15. The characteristic number in this case is defined as $$\frac{\text{Isocyanate amount (actual)}}{\text{Isocyanate amount (calculated)}} \times 100$$

The organo silicate foams are preferably prepared according to the one-shot method. It has been proven to be particularly effective to combine the starting materials into two components with the A-component, as already described, preferably containing the compounds with the reactive hydrogen atoms, the catalysts, the blowing agents, auxiliaries and additives and the B-component preferably consisting of the organic isocyanate. This method is used on a preferred basis.

The advantage of this method consists of the fact that the A- and B-components may be transported in a space-saving manner and can be stored for a limited period of time and only require intensive mixing in the mentioned quantity ratios at temperatures to 10° C. to 50° C., preferably 15° C. to 30° C., prior to the preparation of the organo silicate foams. The reaction mixture is then allowed to foam in open or closed molds with compression ratios of 1.2 to 8, preferably of 2 to 4, generally being used for foaming in closed molds.

The organo silicate foams produced in accordance with this invention have densities of 4 to 150 grams per liter, preferably 7 to 20 grams per liter, show essentially no tendency towards shrinkage and excel by their extensive open-celled nature, good flame resistance and extremely low smoke gas density.

As a result of the good flow properties of the unfoamed reaction mixture and the low pressure development during foaming, the products are particularly well suited for filling thin sandwich elements with foam. The products are also used in the mining industry and in the construction industry for filling out hollow spaces and as light foams.

EXAMPLE 1

Preparation of the stable water glass solution:
To a reactor was added 82.0 kg of aqueous sodium silicate solution ($SiO_2:Na_2O = 1:3.44$) at 38 to 40° Be and initially mixed with 7.13 kg of a 50 percent by weight aqueous sodium hydroxide solution and subsequently with 3.56 kg of N,N,N',N'-tetramethyl-di-(2-aminoethyl)ether at 25° C. while being stirred. For a period of 0.5 hour, 1.88 kg of ethylene oxide gas was introduced into the resultant two-phase reaction mixture at 25° C. while the mixture was being stirred. In order to complete the reaction, the mixture was then stirred for an additional three hours. A clear, stable solution was produced.

EXAMPLE 2

Employing the procedure of Example 1, the following components and amounts were used: 867.0 grams of aqueous sodium silicate solution ($SiO_2:Na_2O=1:3.44$) at 38° Be to 40° Be, 75.4 grams of 50 percent by weight aqueous sodium hydroxide solution, 37.6 grams N,N,N',N'-tetramethyldi-(2-aminoethyl)ether and a mixture of 10 grams of ethylene oxide and 16 grams of 1,2-propylene oxide.

A clear, stable solution was obtained.

EXAMPLE 3

A clear, stable solution was also obtained when the procedure of Example 2 was employed with a mixture of ethylene oxide and 1,2-propylene oxide being replaced by 33.2 grams of 2,3-epoxy-propanol-1.

EXAMPLE 4

An amount of 320 grams of N,N,N',N'-tetramethyldi-(2-aminoethyl)ether was mixed with 496 grams of water in a round flask equipped with a cooled drip funnel, agitator and reflux cooler and 176 grams of ethylene oxide were added to this solution within one hour while the mixtures were being stirred. The reaction temperature was maintained at a maximum of 45° C. by external cooling. In order to complete the reaction, the mixture was then stirred for an additional hour at 25° C.

A portion of this product, 117.8 grams, was stirred into a solution consisting of 76 grams of a 50 percent by weight aqueous sodium hydroxide solution and 826.8 grams aqueous sodium silicate solution ($SiO_2$:$Na_2O$=1:3.44) at 38 to 40° Be at a temperature of 25° C. A clear, stable solution was obtained.

EXAMPLE 5

Preparation of the organo silicate foams:

A-component: a mixture of 160 grams of the water glass solution prepared in accordance with Example 1, 40 grams of water, 8 grams of silicone stablizer DC 190 made by Dow Corning Corporation, 4 grams of triethylamine, 6 grams of a tertiary amino group-containing polyether polyol having a hydroxyl number of 563 prepared by the propoxylation of the column bottoms of the hexamethylenediamine distillation and 60 grams of trichlorofluoromethane was prepared.

B-component: a mixture of 200 grams of a mixture of diphenylmethane diisocyanates and polyphenyl polymethylene polyisocyanates (isocyanate content 31 percent by weight) and 20 grams of tris-chloroethylphosphate was prepared.

One thousand one hundred twelve grams of the A-component and 880 grams of the B-component were mixed by means of an agitator at a speed of 1648 rpm at 25° C. for 10 seconds. The reaction mixture was then introduced into a polyethylene foil bag having a diameter of 60 centimeters and a height of 100 centimeters and was allowed to foam. The product had the following properties:

| | | |
|---|---|---|
| Cream time | | 18 seconds |
| Rise time | | 53 seconds |
| Bulk density (kg/m$^3$) | | 12.7 |
| Compression strength according to DIN 53 420 (N/mm$^2$) | | 14.7 |
| Sag at break according to DIN 53 423 (mm) | | 39.7 |
| Flex strength at maximum deflection according to DIN 53 420 (k.Pa) | | 16.4 |
| Dimensional stability when cold at −30° C. according to AGK 7 | | |
| Deviation - length (%) | | −0.1 |
| Deviation - width (%) | | 0.0 |
| Deviation - thickness (%) | | 0.0 |
| Dimensional stability when heated at 110° C. for 16 hours according to AGK 7 | | |
| Deviation - length (%) | | −0.7 |
| Deviation - width (%) | | −0.7 |
| Deviation - thickness (%) | | 0.0 |
| Burning behavior according to DIN 4102 | | B 2 |

NOTE:
The resultant organo silicate foam was fine celled and abrasion resistant.

The embodiments of the invention in which an exclusive privilege or property is claimed are defined as follows:

1. A stable water glass solution obtained by
   (A) Mixing
      (a) a solution of
         (i) 100 parts by weight of an aqueous alkalisilicate solution, and
         (ii) 1.5 to 20 parts by weight of an alkali hydroxide
      with
      (b) 2 to 12 parts by weight of a tertiary amine, and subsequent oxyalkylation of the resultant two-phase reaction mixture with
      (c) at least one mole of an alkylene oxide per mole of tertiary amine, or
   (B) by oxyalkylation of
      (a) 2 to 12 parts by weight of a tertiary amine with
      (b) at least one mole of an alkylene oxide per mole of tertiary amine
      and mixing of the resultant mixture with
      (c) a solution of
         (i) 100 parts by weight of an aqueous alkali-silicate solution, and
         (ii) 1.5 to 20 parts by weight of alkali hydroxide.

2. The stable water glass solution of claim 1 wherein aqueous sodium and/or potassium water glass solutions with 28 to 60° Be are used as the aqueous alkali silicate solutions.

3. The stable water glass solution of claim 1 wherein aqueous 40 to 60 percent by weight sodium and/or potassium hydroxide solutions are used as the alkali hydroxides.

4. The stable water glass solutions of claim 1 wherein the tertiary amines are selected from the group consisting of N,N,N',N'-tetramethyl-di(-2-aminoethyl)-ether, N,N',N',N'',N''-pentamethyl-diethylenetriamine and N,N-dimethylethanolamine and mixtures thereof.

5. The stable water glass solutions of claim 1 wherein ethylene oxide and/or propylene oxide are used as the alkylene oxides.

6. A process for the preparation of stable water glass solutions wherein
   (A) (a) a solution of
      (i) 100 parts by weight of an aqueous alkalisilicate solution, and
      (ii) 1.5 to 20 parts by weight of an alkali hydroxide are mixed with
   (b) 2 to 12 parts by weight of a tertiary amine
   and the resultant two-phase reaction mixture is oxyalkylated with
      (c) at least one mole of an alkylene oxide per mole of tertiary amine at temperatures of 0° C. to 100° C. while stirring, or
   (B) (b) 2 to 12 parts by weight of a tertiary amine are oxyalkylated with
      (c) at least one mole of an alkylene oxide per mole of tertiary amine at temperatures of 0° C. to 100° C. and the resultant mixture is mixed with
      (a) a solution of (i) 100 parts by weight of an aqueous alkalisilicate solution, and (ii) 1.5 to 20 parts by weight of alkali hydroxide at temperatures of 10° C. to 100° C.

7. A process for the preparation of organosilicate foam by reacting an organic polyisocyanate and a compound with reactive hydrogen atoms in the presence of catalysts, blowing agents, and optionally auxiliaries and additives, wherein the mixtures of stable water glass solutions of claim 1 and tertiary amino group containing polyether polyols are used as compounds with reactive hydrogen atoms.

8. The process of claim 7 wherein a polyether polyol with a functionality of 2 to 5 and a hydroxyl number of 200 to 800 containing 1 to 20 parts by weight of tertiary amino groups is used per 100 parts by weight of stable water glass solutions.

9. The process of claim 7 wherein the characteristic number is 2 to 30.

10. The product of claim 7.

11. The product of claim 8.

12. The product of claim 9.

* * * * *